US007565434B1

(12) United States Patent
Chaturvedi et al.

(10) Patent No.: US 7,565,434 B1
(45) Date of Patent: Jul. 21, 2009

(54) METHOD AND SYSTEM FOR CANCELING SETUP OF A PACKET-BASED REAL-TIME MEDIA CONFERENCE SESSION

(75) Inventors: Pawan Chaturvedi, Overland Park, KS (US); Tong Zhou, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 682 days.

(21) Appl. No.: 10/682,466

(22) Filed: Oct. 9, 2003

(51) Int. Cl.
*G06F 15/16* (2006.01)
(52) U.S. Cl. ............ 709/227; 379/207.02; 379/210.01; 370/351
(58) Field of Classification Search ................ 709/227, 709/203, 223, 224; 455/517; 370/260; 379/201
See application file for complete search history.

(56) References Cited

U.S. PATENT DOCUMENTS

| | | | | |
|---|---|---|---|---|
| 6,167,449 A * | 12/2000 | Arnold et al. | ................ | 709/227 |
| 6,335,927 B1 * | 1/2002 | Elliott et al. | ................ | 370/352 |
| 6,615,236 B2 * | 9/2003 | Donovan et al. | ............ | 709/203 |
| 6,784,901 B1 * | 8/2004 | Harvey et al. | ................ | 715/757 |
| 7,035,655 B2 * | 4/2006 | Maggenti et al. | ............ | 455/517 |
| 7,089,027 B1 * | 8/2006 | Welch et al. | ................ | 455/521 |
| 7,145,901 B2 * | 12/2006 | Tsukada et al. | ............. | 370/352 |
| 7,158,625 B2 * | 1/2007 | Casaccia | ................ | 379/207.02 |

OTHER PUBLICATIONS

Lennox et al. "A Protocol for Reliable Decentralized Conferencing." NOSSDAV' 03 Jun. 1-3, 2003 ACM 1-58113-694.*
"Terminal Mobility" Mobile Computing and Communications Review, vol. 4, No. 3, Aug. 2000.*
Rudolf Pailer, "Using PARLAY APIs Over a SIP System in a Distributed Service Platform for Carrier Grade Multimedia Services". Wireless Networks, 9, 353-363 2003.*

* cited by examiner

*Primary Examiner*—Hung T Vy
*Assistant Examiner*—Tuan-Khanh Phan

(57) ABSTRACT

A method of canceling setup of a real-time media conference session between an originating station and a terminating station via a conference server in a scenario where the conference server receives an invitation message from the originating station to set up a conference session with the terminating station and the conference server receives a cancellation message from the originating station before setup of a conference leg between the conference server and the terminating station is complete. In such a scenario, the conference server would complete setup of the conference leg between the conference server and the terminating station. Then, the conference server may send a teardown message to the terminating station. The teardown message tears down the conference leg between the conference server and the terminating station.

13 Claims, 4 Drawing Sheets

METHOD AND SYSTEM FOR CANCELING SETUP OF A PACKET-BASED REAL-TIME MEDIA CONFERENCE SESSION

BACKGROUND

1. Field of the Invention

The present invention relates to network communications and, more particularly, to a method and system for canceling setup of a packet-based real-time media conference session.

2. Description of Related Art a. Session Setup

In order to set up a real-time media conference session, an originating station will typically send an invitation message to a conference server. The invitation message will cause the conference server to set up conference legs with the originating station and with one or more designated terminating stations. The conference server will then bridge together the conference legs, thereby allowing the originating station and the terminating stations to communicate with each other via the conference server.

In a typical arrangement, the conference server will set up the conference session by responding to the invitation message sent from the originating station by itself sending an invitation message to a designated terminating station. If the terminating station agrees to participate in the conference session, the terminating station will then send an agreement message to the conference server. And the conference server will then send an agreement message to the originating station.

In turn, the originating station will send an acknowledgement message to the conference server, completing setup of a conference leg between the originating station and the conference server. And the conference server will then responsively send an acknowledgement message to the terminating station, completing setup of a conference leg between the conference server and the terminating station. The conference server may then bridge the conference legs together, to allow the originating and terminating station to communicate.

The messages that pass between the conference server and the various stations could comply with an accepted protocol, such as the well-known Session Initiation Protocol (SIP) for instance. Under SIP, the invitation message could be a SIP "INVITE" message, the agreement message could be a SIP "200 OK" message, and the acknowledgement message could be a SIP "ACK" message. SIP could be used to set up the conference session, and the conference legs could comply with the well-known Real-time Transport Protocol (RTP).

b. Cancellation of Session Setup

Once an originating station sends an invitation message to a conference server, the process of setting up the conference session has begun. In some cases, however, the user of the originating station may wish to cancel setup of the conference session. For instance, if a user of the originating station changes his or her mind about setting up the conference session, the user might invoke a cancel or "end" function on the originating station, which may cause the originating station to send a cancellation message to the conference server. In SIP, the cancellation message could be a SIP "CANCEL" message.

Conventionally, the cancellation message functions to cancel a previous signaling request that has not yet been acted upon completely. For instance, if a first node has sent an invitation message to a second node and the second node has not yet sent an agreement message in response, the first node can send a cancellation message to the second node to cancel the invitation and end the session setup.

A problem, however, can arise when trying to cancel setup of a conference session. In particular, if the originating station has sent an invitation message to the conference server and has not yet received an agreement message in response from the conference server, the originating station might send a cancellation message to the conference server to cancel the conference session. It is possible that in this scenario the conference server has already sent an invitation message to the terminating station and the terminating station has already sent an agreement message to the conference server, when the conference server receives the cancellation message from the originating station. Thus, if the conference server sends a cancellation message to the terminating station, the cancellation message would be ineffective because the terminating station has already acted upon the invitation message that it received from the conference server. In this case, the terminating station would simply ignore any cancellation message sent by the conference server.

In this scenario, the terminating station would assume that a conference session is being set up and would likely alert a user of the new session. However, because the terminating station would ignore the cancellation message, the terminating station would not then alert the user that the session setup has been cancelled. At the same time, however, since the conference server might have received a cancellation message from the originating station before the conference server sent an agreement message to the originating station, setup of a conference leg between the originating station and the conference server would in fact be cancelled. The end result could then be that the terminating station would answer the call only to find that the caller has hung up. This situation is undesirable.

SUMMARY

The present invention applies in a scenario where (a) an originating station sent to a conference server an invitation message seeking to set up a conference session with at least one terminating station via the conference server and (b) the originating station sends a cancellation message to the conference server before setup of a conference leg between the conference server and the terminating station is complete.

As noted above, in this scenario, if the conference server just responsively sends a cancellation message to the terminating station, the terminating station would simply ignore the cancellation message if the terminating station has already responded to the invitation message from the conference server.

Instead, according to an exemplary embodiment of the invention, when the conference server receives the cancellation message from the originating station, the conference server (i) will complete setup of a conference leg with the terminating station and (ii) will then send a teardown message to the terminating station to tear down the conference leg with the terminating station. In SIP, the teardown message could be a SIP "BYE" message.

For instance, the exemplary embodiment can apply in a scenario where the conference server (a) receives a SIP INVITE message from the originating station, (b) responsively sends a SIP INVITE message to the terminating station, and (c) then receives a SIP CANCEL message from the originating station before a conference leg is completely set up between the conference server and the terminating station (i.e., at least before the conference server has sent a SIP ACK message to the terminating station in response to a SIP 200 OK message from the terminating station).

In that scenario, in response to the SIP CANCEL message, the conference server will first complete setup of a conference leg with the terminating station. To do so, the conference server will wait to receive the SIP 200 OK message from the terminating station, if not already received. When the conference server receives the SIP 200 OK message from the terminating station, the conference server will then unconventionally send a SIP ACK message to the terminating station without first waiting to receive a SIP ACK message from the originating station, thereby completing setup of the conference leg with the terminating station.

After completing setup of the conference leg with the terminating station, the conference server will then send a SIP BYE message to the terminating station, which will function to tear down the conference leg between the conference server and the terminating station. Conventionally, the terminating station will then respond to the SIP BYE message by sending a SIP 200 OK message to the conference server.

Although the terminating station may have answered the call when it received the SIP INVITE message from the conference server, the terminating station may then alert a user that the call has ended when it receives the SIP BYE message. This improves the user experience at the terminating end.

These as well as other aspects and advantages will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Exemplary System

Figure 1:
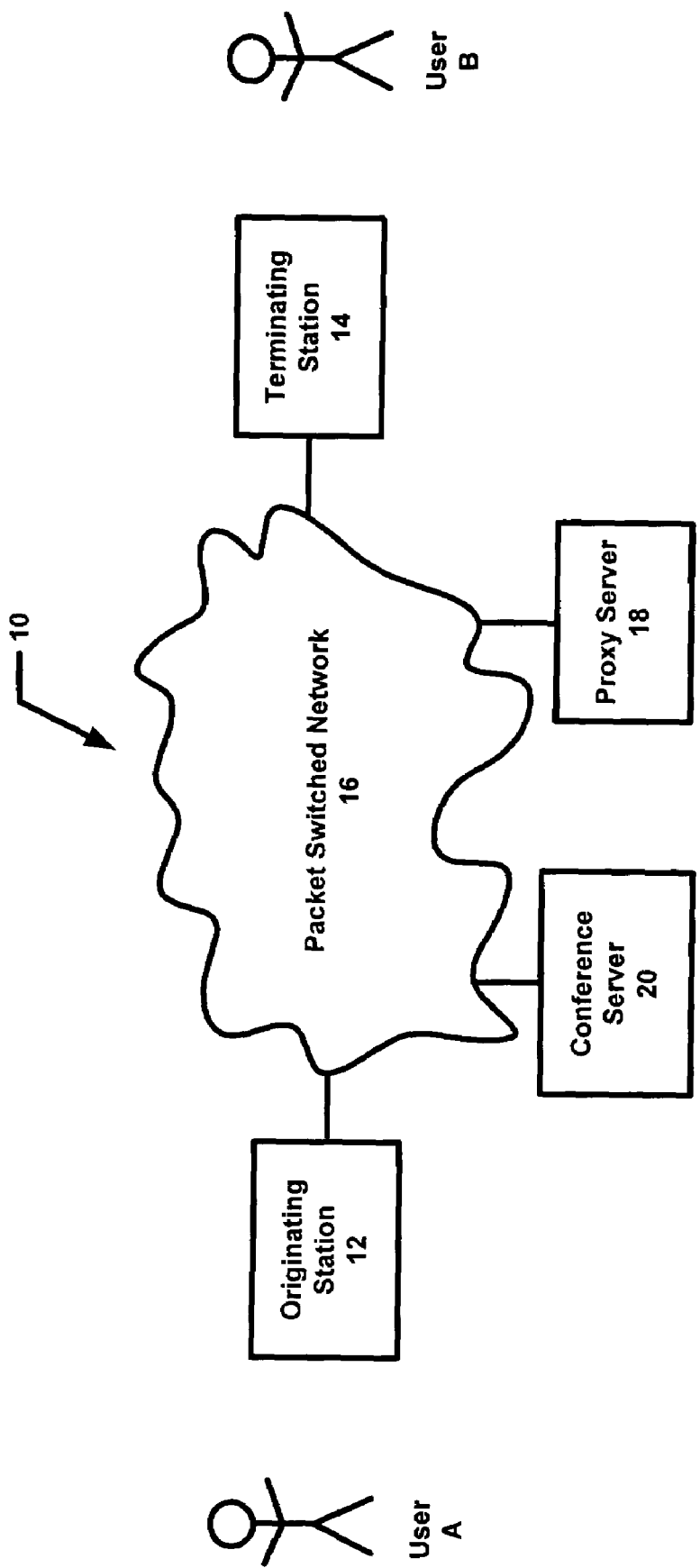
FIG. 1 is a block diagram of a packet-based network.

Referring to the drawings, FIG. 1 illustrates an exemplary communication system 10 arranged to provide packet-based real-time media conferencing. For simplicity, FIG. 1 depicts an originating station 12 and a terminating station 14 coupled to a packet-switched network 16. The originating station 12 may be arranged to originate a conference session with the terminating station 14, over the packet switched network 16. User A may operate the originating station 12 and user B may operate the terminating station 14.

It should be understood, of course, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

In the exemplary arrangement of FIG. 1, each station 12, 14 is preferably equipped with hardware and logic to establish network connectivity with the packet-switched network 16 and to engage in a packet-based real-time media conference session. To be able to establish network connectivity, for instance, each station 12, 14 may be equipped with a wired or wireless interface and logic to gain a data connection. To be able to set up a packet-based real-time media conference session, each station 12, 14 may be programmed (i) to engage in SIP signaling or other session initiation signaling, (ii) to receive media from a user and to play out media to a user, and (iii) to receive and send digital representations of the media according to RTP or another designated protocol.

A proxy server 18 and a conference sever 20 might also be coupled to, or accessible by, the packet-switched network 16. The proxy server 18 may be a signaling proxy, such a SIP proxy server, that functions to forward or direct signaling messages from point to point through the packet-switched network 16. The conference server 20 may be programmed to engage in signaling communication according to SIP or another designated protocol, in order to set up a conference leg with each participating station. Also, conference server 20 may further be programmed to receive and send media streams according to RTP or another designated protocol. Conference server 20 may be a discrete entity, such as a multipoint control unit (MCU). Alternatively, conference server 20 may comprise a number of components, such as (i) an MCU that bridges communications, and (ii) a controller that functions to set up and control conference legs through the MCU, using third party call control techniques well-known to those skilled in the art. Other arrangements are also possible.

2. Conventional Conference Session Setup

Figure 2:
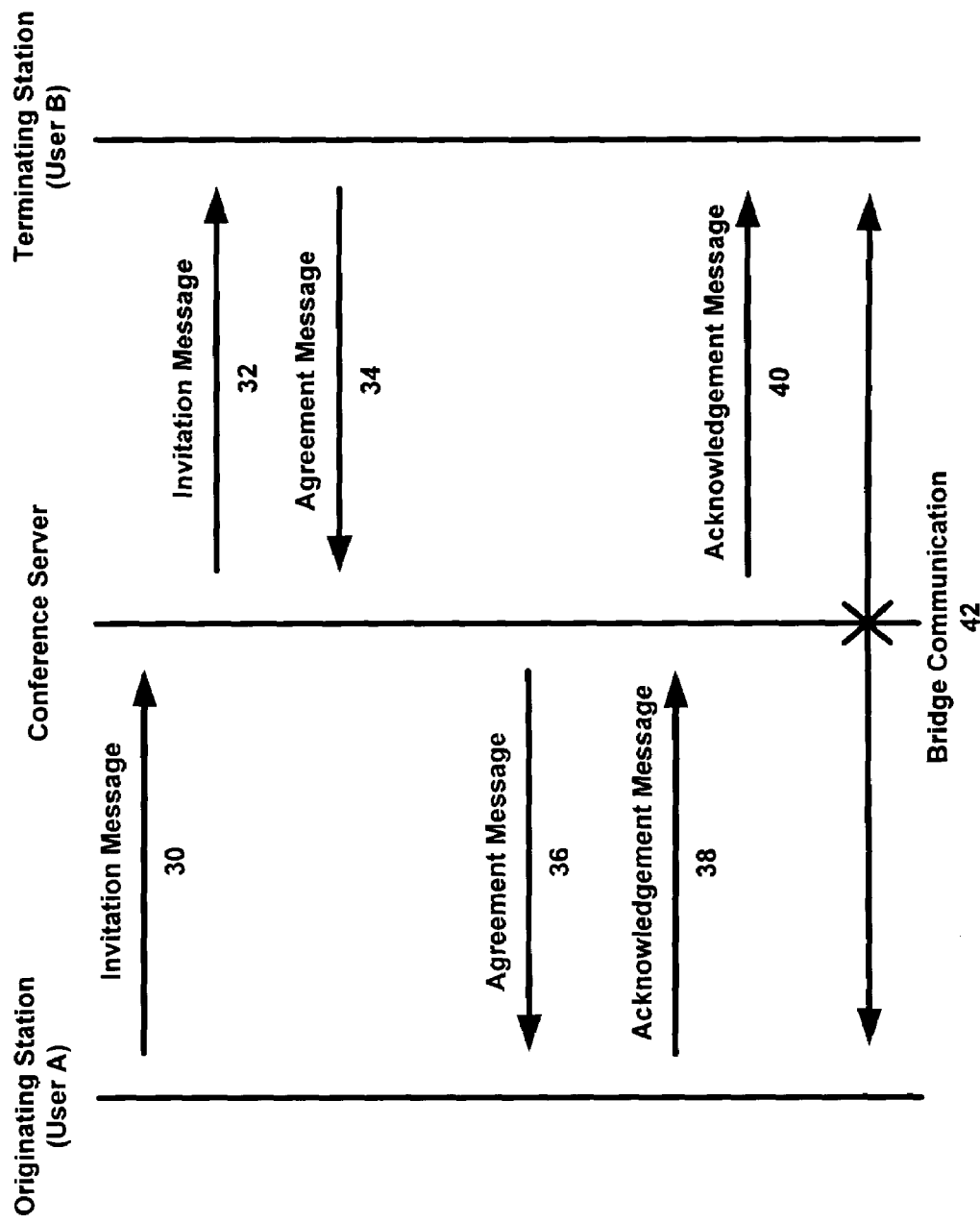
FIG. 2 is a flow chart that illustrates exchange of messages between user stations on the packet-based network to establish a real-time media conference session.

FIG. 2 next depicts a typical method of setting up a packet-based real-time media conference session between the originating station 12 and the terminating station 14, in the arrangement of FIG. 1. User A may might provide an indication to the originating station 12 to initiate a conference session with User B at the terminating station 14, such as by pushing a button on the originating station 12 or providing some type of instruction to the originating station 12. As shown in FIG. 2, at step 30, in response to the indication, the originating station 12 may send an invitation message to the conference server 20. The invitation message may take the form of a SIP INVITE message that describes the type of session as a packet-based real-time media conference session, in accordance with the Session Description Protocol (SDP). The invitation message may also designate the terminating station 14 (or user B) as a target participant.

Upon receipt of the session invitation message, at step 32, the conference server 20 may then send an invitation message to the terminating station 14 in an effort to set up a conference leg with the terminating session. At step 34, upon receipt of the invitation message, the terminating station 14 may respond with an agreement message to the conference server 20. The agreement message may be a SIP 200 OK message that indicates willingness to participate in the conference session. The conference server 20 may receive the agreement message, and at step 36, send an agreement message to the originating station 12, similarly indicating willingness to participate in the conference session.

At step 38, the originating station 12 then responds to the conference server 20 with an acknowledgement message, thereby completing setup of a conference leg between the originating station 12 and the conference server 20. The acknowledgment message may take the form of a SIP ACK message. In addition, at step 40, the conference server 20 similarly responds to the terminating station 14 with an acknowledgement message, thereby completing setup of a conference leg between conference server 20 and the terminating station 14. At step 42, the conference server 20 then bridges communications between users A and B according to RTP or another designated protocol.

3. Cancellation of Setup of Real-Time Media Conference Session

As noted above, in some instances, user A may seek to cancel initiation of a conference session with user B. In particular, user A may seek to cancel the conference session after the originating station 12 sent an invitation message to the conference server 20, but before the conference server 20 responds to the invitation message with an agreement message.

The originating station 12 might send a cancellation message to the conference server 20 to cancel the conference session. The cancellation message may indicate that user A seeks to cancel the conference session that was previously initiated. Because the conference server 20 did not respond to the invitation message, the conference server would receive the cancellation message and responsively cancel initiation of the conference leg between the originating station 12 and the conference server 20.

The conference server 20 would also have to cancel any initiation of the conference leg between the conference server 20 and the terminating station 14, in order to fully cancel the conference session between users A and B. However, sending the cancellation message to the terminating station 14 might be ineffective to cancel the conference leg between the conference server 20 and the terminating station 14 if (i) the conference server 20 has already sent an invitation message to the terminating station 14 and (ii) the terminating station 14 has already sent an agreement message to the conference server 20. The terminating station 14 would have already responded to the invitation message and therefore would ignore any cancellation message subsequently received from the conference server 20.

In accordance with an exemplary embodiment of the present invention, the conference server 20 would complete setup of the conference leg between the conference server 20 and the terminating station 14 in response to receiving the cancellation message. The conference server 20 and terminating station 14 would complete exchange of the invitation, agreement, and acknowledgment messages before the conference server 20 sends any agreement message to the originating station 12. Then, after setup of the conference leg and also in response to the cancellation message, the conference server 20 may send a teardown message to the terminating station 14 to tear down the conference leg between the conference server 20 and the terminating station 14. The teardown message sent by the conference server 20 allows the terminating station 14 to alert user B that the call has ended. This improves user B's experience on the terminating station 14.

Figure 3:
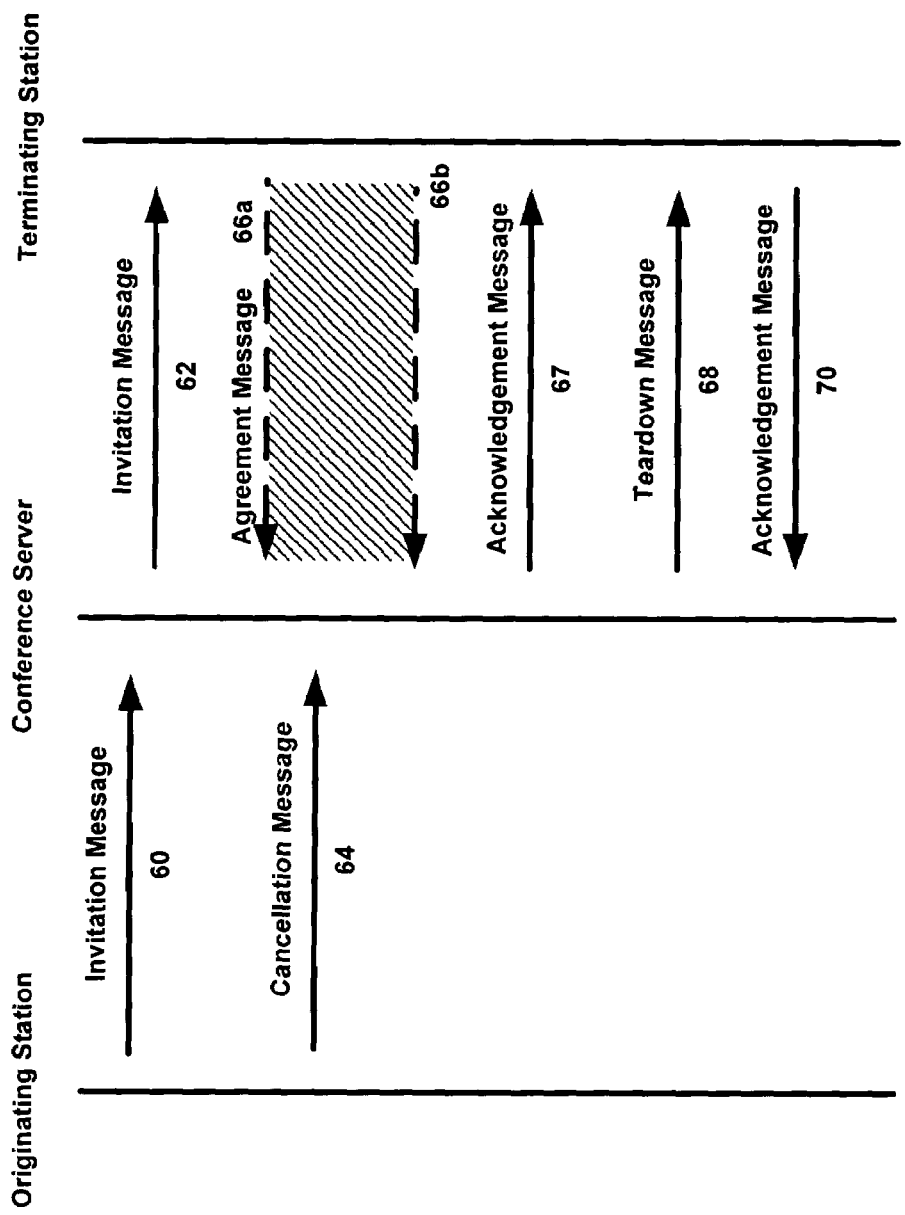
FIG. 3 is a call flow that illustrates exchange of messages between user stations to cancel a conference leg in accordance with the exemplary embodiment.

FIG. 3 illustrates exchange of messages between an originating station 12, a terminating station 14, and a conference server 20 to cancel a conference leg, in accordance with the exemplary embodiment. The proxy server 18 may function to forward the messages exchanged between the originating station 12, terminating station 14, and conference server 20, but other arrangements are also possible.

At step 60, the originating station 12 may send an invitation message to a conference server 20. The invitation message may take the form of a SIP INVITE message. The SIP INVITE message may signal setup of a packet-based real-time media conference session and may designate the terminating station 14 as a target participant. The conference server 20 may receive the invitation message and, at step 62, responsively send an invitation message to the terminating station 14. After sending the invitation message and before the conference server 20 sends an agreement message in response to the invitation message, at step 64, the originating station 12 may send a cancellation message to the conference server 20. The cancellation message may take the form of a SIP CANCEL message.

Conventionally, the cancellation message functions to cancel a previous signaling request that has not yet been acted upon completely. The SIP CANCEL message may be sent to cancel the SIP INVITE message that the originating station 12 sent to the conference server 20 at step 60. In accordance with the exemplary embodiment, the conference server 20 will complete setup of the conference leg with the terminating station 14, when (i) the conference server 20 receives a cancellation message and (ii) the conference server 20 has already sent an invitation message to the terminating station 14. As noted above, the setup will be unconventional because the conference server 20 does not send any agreement message to the originating station 12 before completing setup of the conference leg with the terminating station 12.

The manner in which the conference server 20 completes setup of the conference leg may depend on timing of receipt of the cancellation message by the conference server 20. For instance, at step 66a, the conference server 20 may receive the cancellation message at the same time or after the conference server 20 receives an agreement message from the terminating station 14, in response to the invitation message. If the conference server 20 receives the cancellation message at the same time or after receiving the agreement message, then at step 67 the conference server 20 may responsively send an acknowledgement message to the terminating station 14. The acknowledgment message may take the form of a SIP ACK message. The acknowledgment message completes setup (unconventionally) of the conference leg with the terminating station 14.

Alternatively, the conference server 20 may receive the cancellation message after the conference server 20 sends the invitation message to the terminating station 14, but before the conference server 20 receives an agreement message in response to the invitation message. If the conference server 20 receives the cancellation message after sending the invitation message to the terminating station 14 but before receiving the agreement message at step 66b, then the conference server 20 may wait for the agreement message from the terminating station 14. Then, after receiving the agreement message, at step 67, the conference server 20 may send an acknowledgement message to the terminating station 14. Again, the acknowledgment message may take the form of a SIP ACK message. The acknowledgment message completes setup (again, unconventionally) of the conference leg with the terminating session 14.

After setup of the conference leg with the terminating station 14, at step 68, the conference server 20 will send a teardown message to the terminating station 14. The teardown message may be a SIP BYE message sent to the terminating station 14. The SIP BYE message will function to tear down the conference leg between the conference server 20 and the terminating station 14. At step 70, the terminating station 14 will then respond to the SIP BYE message by sending an acknowledgment message to the conference server 20. The acknowledgement message may take the form of a SIP 200 OK message to the conference server 20. The SIP 200 OK message may indicate to the conference server 20 that the conference leg is terminated. In response to sending the SIP 200 OK message, the terminating station 14 might also alert the user that the call is terminated. The exemplary embodiment improves user B's experience at the terminating station 14 because user B does not have to answer the call from user A in order to find out that user A hung up and cancelled the conference session.

Figure 4:
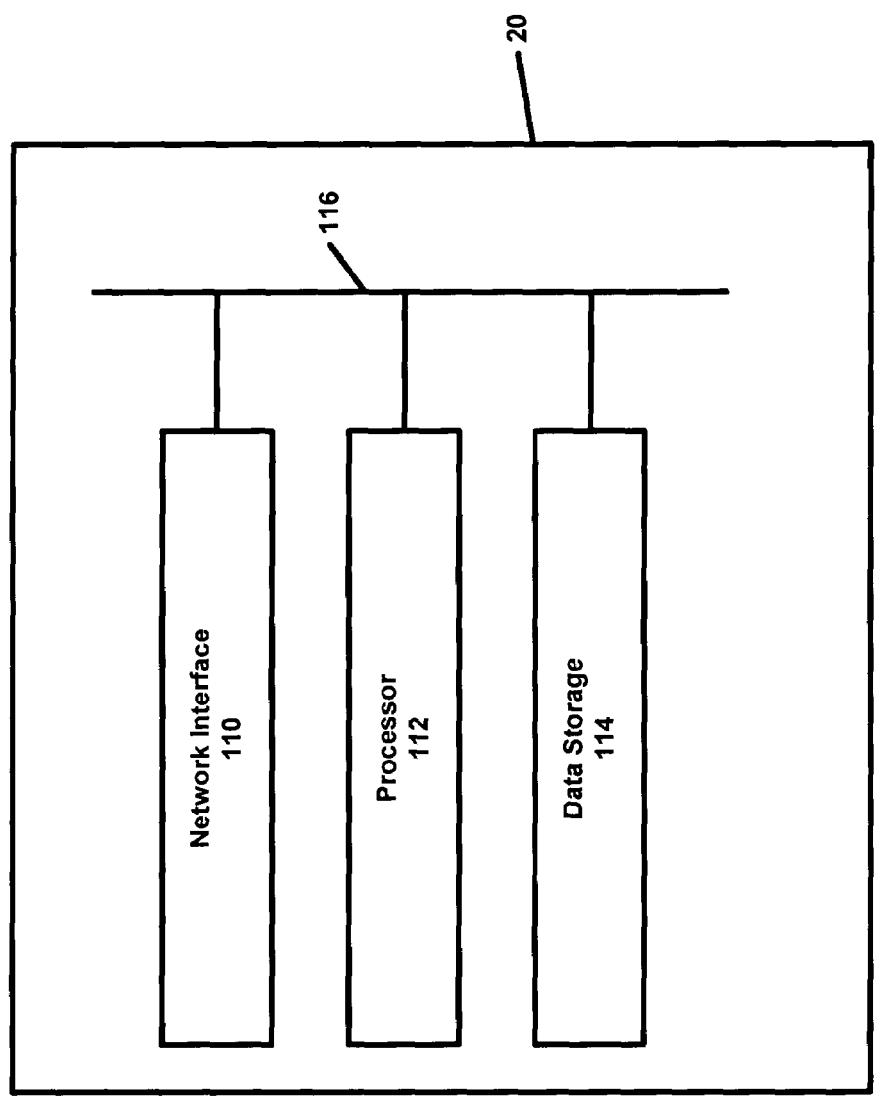
FIG. 4 is a block diagram of a conference server on the packet-based network.

FIG. 4 shows a generalized block diagram of a representative conference server 20. Conference server 20 would typically sit at a defined IP address in the packet-switched network 16. As illustrated, the conference server 20 includes a network interface unit 110, at least one processor 112, and data storage 114, all tied together via a system bus 116 or other mechanism.

Network interface 110 functions to provide connectivity with the packet-switched network 16. As such, network interface unit 110 may receive packets from the packet-switched network 16 and may route packets over the packet-switched network 16. A suitable network interface unit 110 is an Ethernet card, but other examples are also possible.

Data storage 114 then serves to store logic executable by processor 112 to carry out various functions described herein. As such, data storage 112 may take various forms, in one or more parts. For example, data storage 112 may comprise a storage block resident permanently in the conference server 20, which holds program instructions defining logic executable by the processor. The logic may define various functions to facilitate network communication and real-time media conferencing.

For example, the logic may cause the processor 112 to receive an invitation message from the originating station 12 and responsively send an invitation message to the terminating station 14. The logic may also include a mechanism for determining that a cancellation message is received from the originating station 12.

The conference server 20 may receive the cancellation message after the conference server 20 sends the invitation message to the terminating station 14, but before the conference server 20 receives an agreement message in response to the invitation message. If the conference server 20 receives the cancellation message after sending the invitation message to the terminating station 14 but before receiving the agreement message, then the logic may cause the processor 112 to wait for the agreement message from the terminating station 14. After receiving the agreement message, the logic may cause the processor 112 to send an acknowledgement message to the terminating station 14. The acknowledgment message completes setup (unconventionally) of the conference leg with the terminating session.

Alternatively, the conference server 20 may receive the cancellation message at the same time or after the conference server 20 sends the invitation message to the termination station 14 and receives from the terminating station 14 an agreement message in response to the invitation message. If the conference server 20 receives the cancellation message at the same time or after receiving the agreement message, then the logic may cause the processor 112 to responsively send an acknowledgement message to the terminating station 14. The acknowledgment message completes setup (again, unconventionally) of the conference leg with the terminating station 14.

After setup of the conference leg with the terminating station 14 and in response to the cancellation message, the logic may cause the processor 112 to send a teardown message to the terminating station 14. The teardown message may be a SIP BYE message to the terminating station 14. The SIP BYE message will function to tear down the conference leg between the conference server 20 and the terminating station 14.

An exemplary embodiment of the present invention has been described above. Those skilled in the art will understand, however, that changes and modifications may be made to this embodiment without departing from the true scope and spirit of the present invention, which is defined by the claims.

What is claimed is:

1. A method of canceling setup of a conference between an originating station and a terminating station via a conference server in a scenario where (a) the conference server has received an invitation message from the originating station seeking to set up the conference with at least the terminating station and (b) the conference server then receives a cancellation message from the originating station before setup of a conference leg between the conference server and the terminating station is complete, the method comprising:

in response to the cancellation message, (i) completing setup of the conference leg between the conference server and the terminating station and (ii) then sending a teardown message from the conference server to the terminating station to tear down the conference leg between the conference server and the terminating station, wherein, if the conference server has already received an agreement message from the terminating station agreeing to participate in the session, then completing setup of the conference leg between the conference server and the terminating station comprises sending an acknowledgement message from the conference server to the terminating station; and if the conference server has not yet received the agreement message from the terminating station agreeing to participate in the session, then completing setup of the conference leg between the conference server and the terminating station comprises (i) the conference server receiving the agreement message from the terminating station and (ii) sending the acknowledgement message from the conference server to the terminating station.

2. The method of claim 1, wherein the conference server carries out the completing and sending functions.

3. The method of claim 1, wherein the invitation message is a Session Initiation Protocol (SIP) INVITE message, the cancellation message is a SIP CANCEL message, and the teardown message is a SIP BYE message.

4. The method of claim 1, wherein the acknowledgement message is a Session Initiation Protocol (SIP) ACK message.

5. The method of claim 1, wherein the invitation message is a Session Initiation Protocol (SIP) INVITE message, the agreement message is a SIP 200 OK message, and the acknowledgement message is a SIP ACK message.

6. The method of claim 1, wherein the conference leg is a Real-time Transport Protocol (RTP) session.

7. A method of canceling setup of a conference via a conference server comprising the steps of:

receiving a first invitation message from a first station, seeking to set up a conference session with a second station;

responsive to the first invitation message, sending a second invitation message to a second station, seeking to set up a conference leg with the second station;

receiving a cancellation message from the first station before completing setup of the conference leg with the second station; and responsive to the cancellation message, (i) completing set up of the conference leg with the second station by waiting to receive an agreement message from the second station, if not already received, and then sending an acknowledgment message to the second station without waiting to receive an acknowledgment message from the first station thereby completing setup of the conference leg with the second station, and (ii) sending a teardown message to the second station, seeking to tear down the conference leg with the second station, wherein, if the conference server has already received an agreement message from the second station agreeing to participate in the session, then completing setup of the conference leg between the conference server and the second station comprises sending an acknowledgement message from the conference server to the second station; and if the conference server has not yet received the agreement message from the second station agreeing to participate in the session, then completing setup of the conference leg between the conference server and the second station comprises (i) the conference server receiving the agreement message from the second station and (ii) sending the acknowledgement message from the conference server to the second station.

8. The method of claim 7, wherein:
the first invitation message is a Session Initiation Protocol (SIP) INVITE message;
the second invitation message is a SIP INVITE message;
the cancellation message is a SIP CANCEL message; and
the teardown message is a SIP BYE message.

9. The method of claim 7, wherein the conference leg is a Real-time Transport Protocol (RTP) session.

10. A conference server comprising:
a processor;
data storage;
logic stored in the data storage and executable by the processor in a scenario where (a) the conference server has received from an originating station an invitation message seeking to set up a conference with at least one terminating station via the conference server and (b) the conference server then receives a cancellation message from the originating station before setup of a conference leg between the conference server and the terminating station is complete, wherein the logic causes the processor to (i) complete setup of the conference leg between the conference server and the terminating station and (ii) then send a teardown message to the terminating station to tear down the conference leg between the conference server and the terminating station, wherein if the conference server has already received an agreement message from the terminating station agreeing to participate in the session, then completing setup of the conference leg between the conference server and the terminating station comprises sending an acknowledgement message from the conference server to the terminating station; and if the conference server has not yet received the agreement message from the terminating station agreeing to participate in the session, then completing setup of the conference leg between the conference server and the terminating station comprises (i) the conference server receiving the agreement message from the terminating station and (ii) sending the acknowledgement message from the conference server to the terminating station.

11. The conference server of claim 10, wherein
the invitation message is a Session Initiation Protocol (SIP) INVITE message;
the cancellation message is a SIP CANCEL message; and
the teardown message is a SIP BYE message.

12. The conference server of claim 10, wherein the conference leg is a Real-time Transport Protocol (RTP) session.

13. The conference server of claim 10, further comprising a network interface for communicating over a packet-switched network.

* * * * *